United States Patent

Ng et al.

[11] Patent Number: 5,816,096
[45] Date of Patent: Oct. 6, 1998

[54] CALIBRATION FRAME

[75] Inventors: Kim Chew Ng, Wheelers Hill; Kemal Ajay, Mount Waverley, both of Australia

[73] Assignees: Southwal Pty, Ltd, East Sydney; Montech Pty, Ltd, Melbourne, both of Australia

[21] Appl. No.: 809,003
[22] PCT Filed: Sep. 6, 1995
[86] PCT No.: PCT/AU95/00575
§ 371 Date: May 5, 1997
§ 102(e) Date: May 5, 1997
[87] PCT Pub. No.: WO96/07869
PCT Pub. Date: Mar. 14, 1996

[30] Foreign Application Priority Data

Sep. 6, 1994 [AU] Australia ............... PM 7894

[51] Int. Cl.⁶ ............... G01B 1/00
[52] U.S. Cl. ............... 73/1.79
[58] Field of Search ............... 73/1.79, 1.81; 348/137, 135, 141, 180, 94, 95; 364/571.01

[56] References Cited

U.S. PATENT DOCUMENTS 5,444,481 8/1995 Oshima et al. ............... 348/180
5,467,634 11/1995 Brady et al. ............... 73/1.79

*Primary Examiner*—Robert Raevis
*Attorney, Agent, or Firm*—Flerh Hohbach Test Albritton & Herbert

[57] ABSTRACT

A calibration frame for a non-contact measurement system includes a frame structure (12); a plurality of targets (14) which may be light emitting diodes supported by the frame structure for viewing by the measurement system; control means for activating each of the targets for allowing the targets to be identified by the measurement system; memory means for storing data relating to the position of each target; and a communication link such as an infrared link for transferring data from the calibration frame to the measurement system which relates to the position of that target.

12 Claims, 9 Drawing Sheets

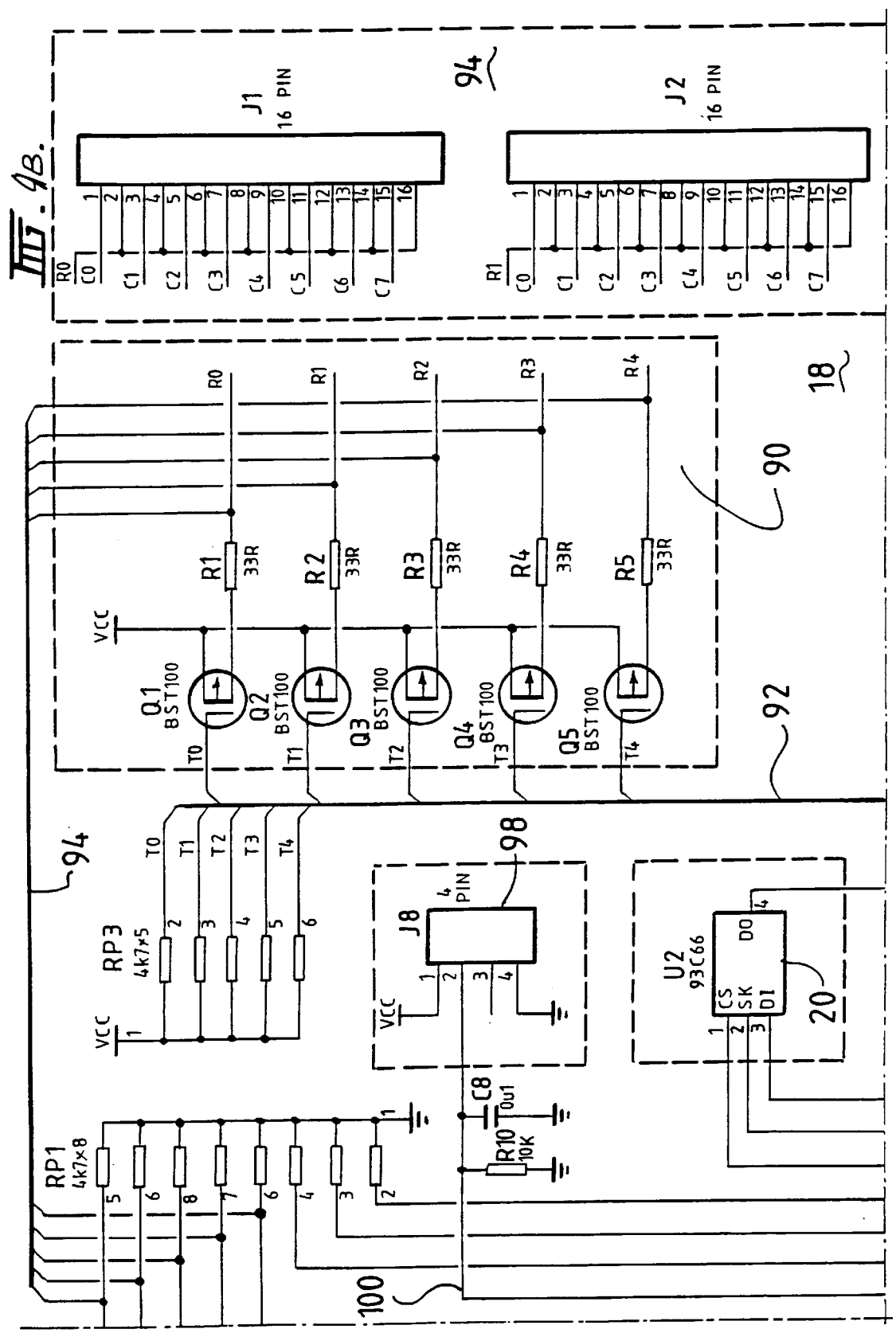

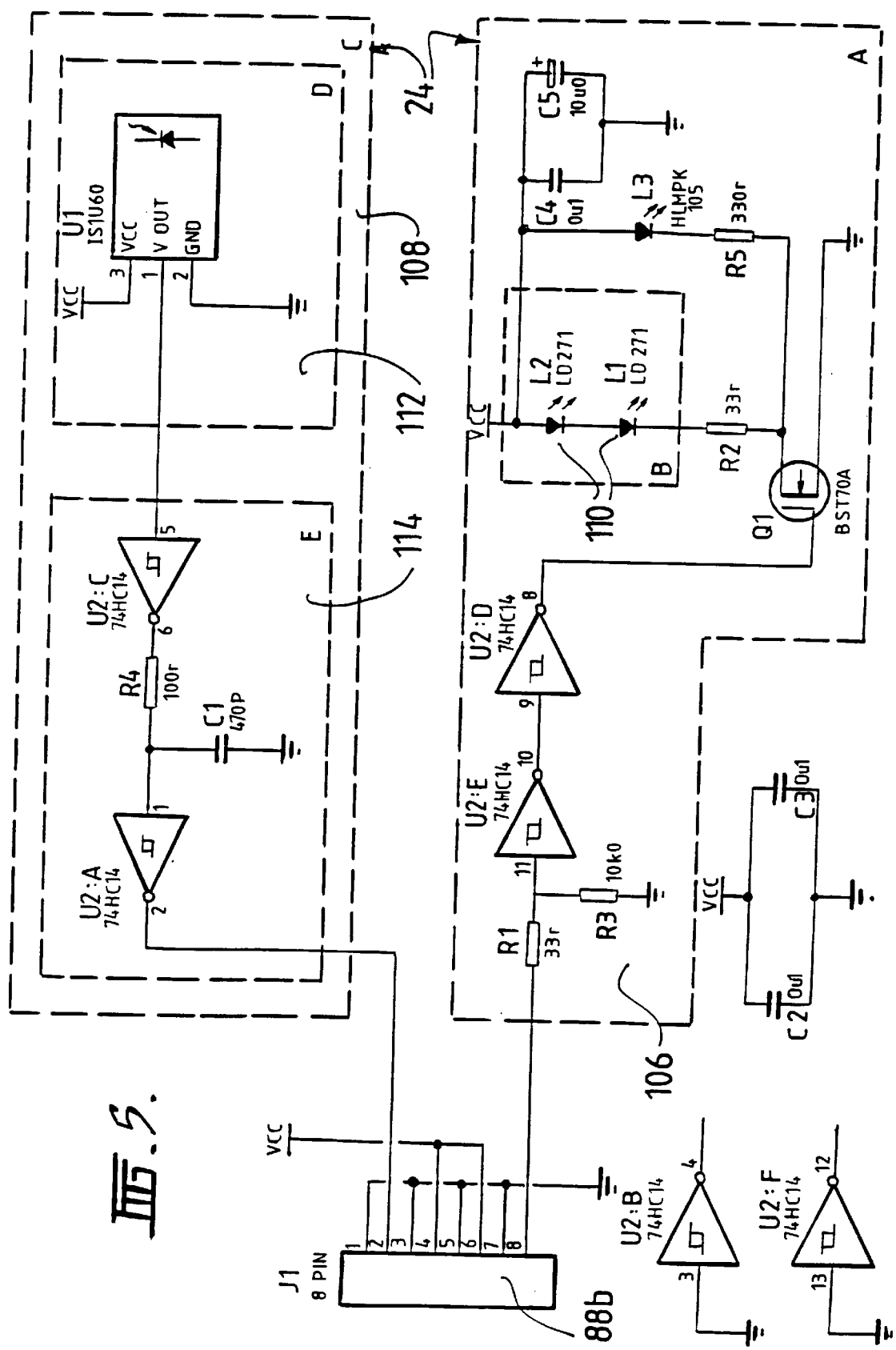

CALIBRATION FRAME

The invention relates to a calibration frame for shape measurement systems and in particular to a calibration frame for non-contact optical video camera based shape measurement systems where it is desired to determine the measurement system's physical and geometric properties. Such properties may be used to calibrate the measurement system allowing accurate measurements to be made.

Calibration frames of various forms exist which are viewed by the measurement system which correlates the three-dimensional coordinates of features on the frame with the measurement system's observation of them. These frames are usually precisely constructed objects with features marked on their surface using a contrasting medium. Such features may be a black circle painted on a white surface forming a target or may be of some other pattern which allows the precise location of the target's centre by optical means.

Systems using such frames rely on some degree of interaction with an operator to guide the system's detection of the frame's targets and to enter the three-dimensional coordinates of these targets.

Such systems are prone to operator error causing incorrectly located target centres or causing incorrect three-dimensional coordinates to be entered into the measurement system relating to a particular target. The result of such operator errors is a degradation in the accuracy of the measurement system.

The object of this invention is to provide a calibration frame which overcomes these problems.

The invention may be said to reside in a calibration frame for a non-contact measurement system, including:

a frame structure;

a plurality of targets supported by the frame structure for viewing by the measurement system;

control means for activating each of the targets for allowing the targets to be identified by the measurement system;

memory means for storing data relating to the position of each target; and a communication link for transferring data from the calibration frame to the measurement system which relates to the position of that target.

Thus, according to the present invention the measurement system can detect the calibration frame and, in particular, targets activated in the calibration frame by the control means. Information relating to the particular target together with its positional information can then be relayed to the measurement system by the communications link so that the measurement system is provided with the exact positional data relating to the target so that the measurement system receives accurate data to enable calibration of the measurement system.

Preferably the targets comprise light sources.

Preferably the calibration frame includes a rechargeable battery supply for powering the calibration frame to thereby enable the calibration frame to be easily transported and used.

Preferably the calibration frame includes temperature sensing means for sensing the temperature of the environment in which the calibration frame is located and for providing temperature information to thereby provide an indication of any possible expansion or contraction of the frame which would alter the position of the targets with respect to one another.

Preferably the frame structure includes two adjacent sides arranged at an angle with respect to one another and most preferably the sides are formed from aluminium.

Preferably the light sources comprise light emitting diodes.

Preferably the communications link is a bi-directional infrared data link.

Preferably the control system is a microprocessor controller.

Preferably the memory means is an electrically erasable programmable read only memory.

A preferred embodiment of the invention will be described, by way of example, with reference to the accompanying drawings in which:

FIGS. 4, 4A–4F are detailed circuit diagrams of the control system in the calibration frame according to FIGS. 1 and 2; and FIG. 5 is a circuit detail of the communication link in the preferred embodiment of the invention.

Figure 1:
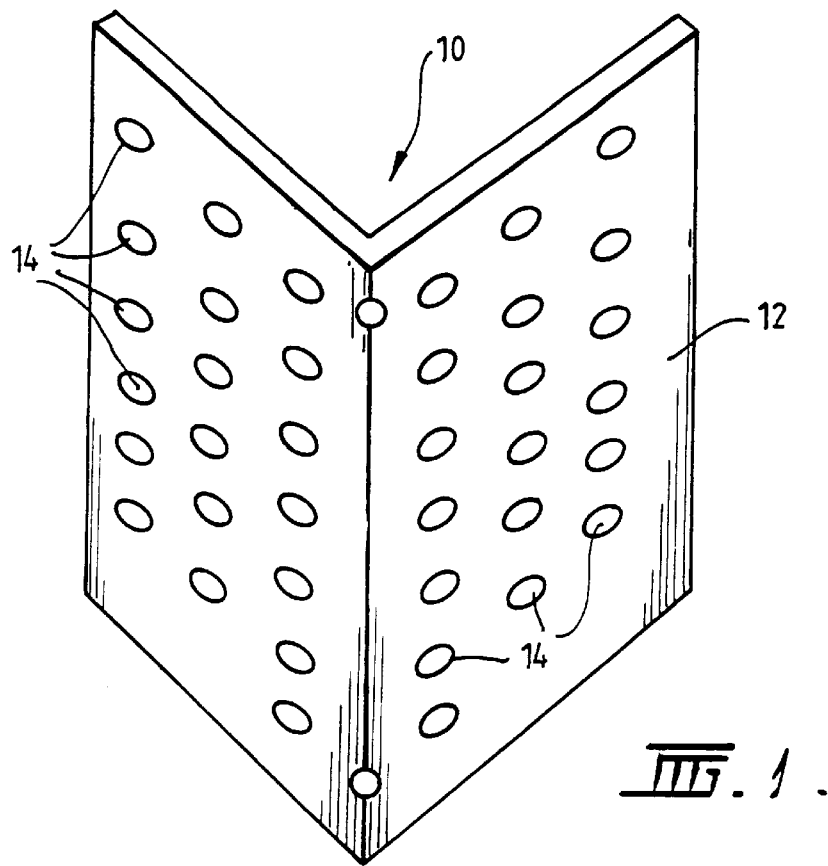
FIG. 1 is a view of a calibration frame according to the preferred embodiment of the invention.
Figure 2:
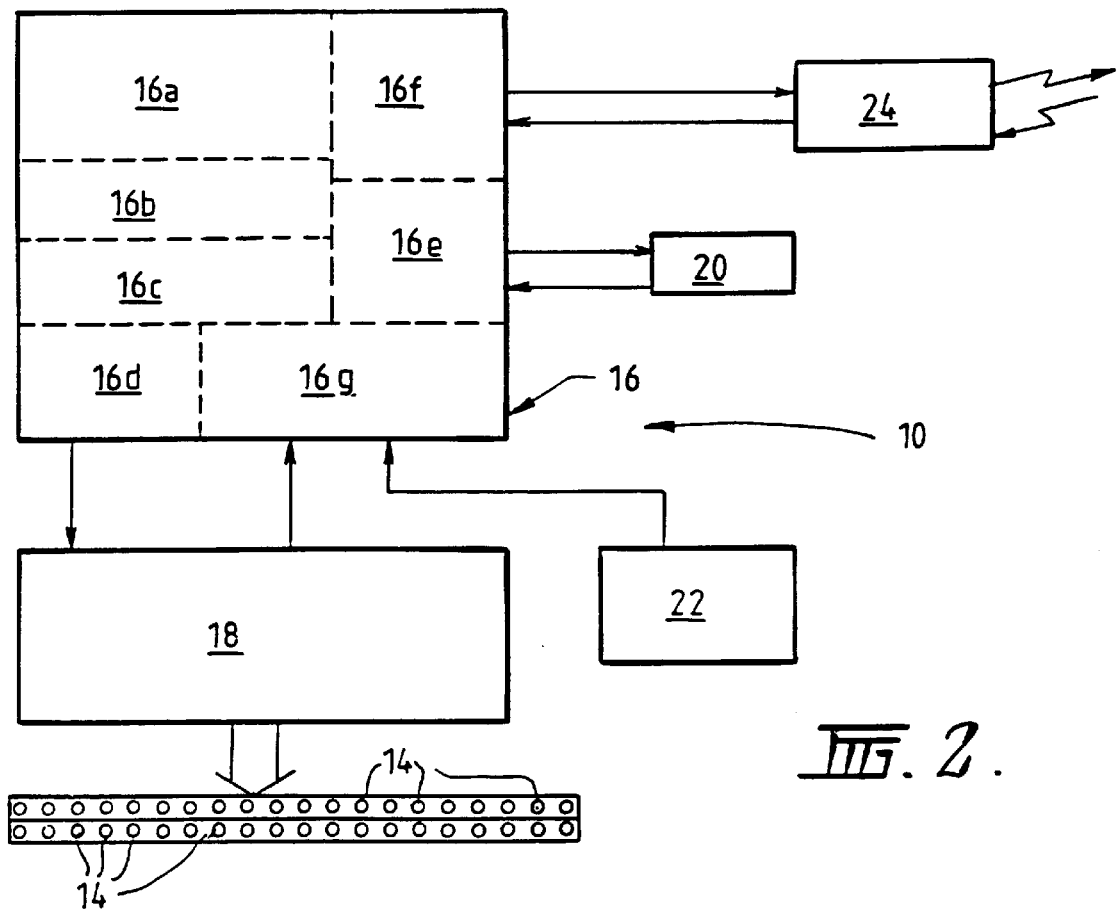
FIG. 2 is a block diagram of the calibration frame of FIG. 1.

With reference to FIGS. 1 and 2, a calibration frame 10 is shown which comprises a rigid frame structure 12 preferably made from aluminium and in the form of two adjacent sides of a rectangular prism which are arranged at an angle with respect to one another. The rigid frame structure 12 supports a plurality of light emitting diodes 14.

As is best shown in FIG. 2, the calibration frame 10 includes a microprocessor controller 16 which is coupled to an LED driver circuit 18 which in turn is coupled to the light emitting diodes 14 for powering the light emitting diodes 14. An EEPROM memory 20 is also connected to the microprocessor controller 16 as is a temperature probe 22 for providing temperature information as will be described hereinafter. The microprocessor controller is also connected to an infrared transceiver 24 for providing a communications link for transmitting data to a measurement system 30 (see FIG. 3) and for receiving data and information from the measurement system 30.

Figure 3:
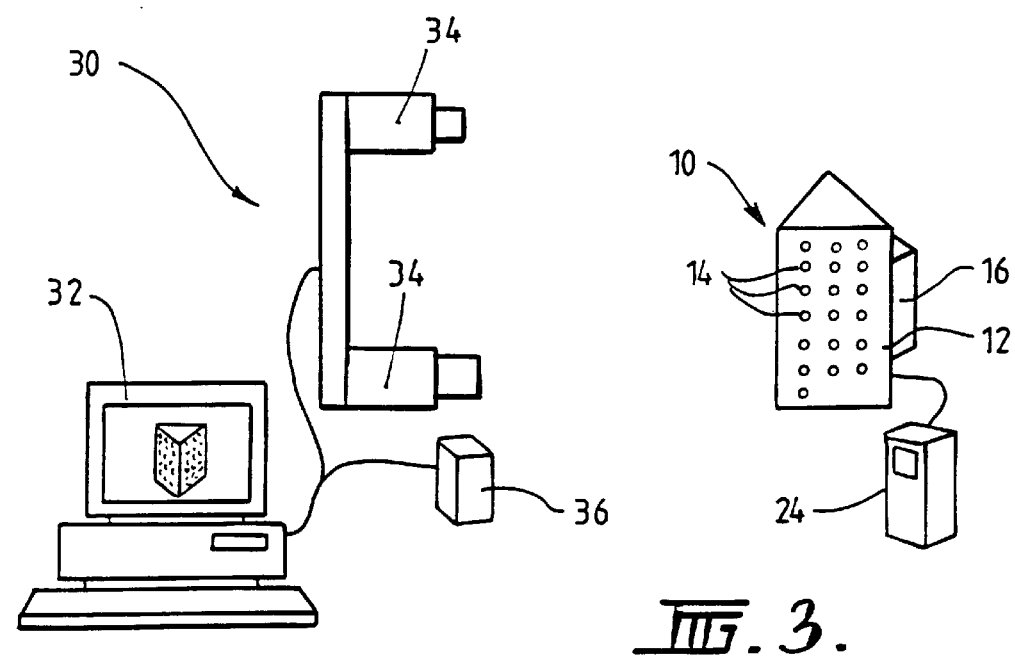
FIG. 3 is a view of a measurement system including the calibration frame of FIGS. 1 and 2.
Figure 4A:
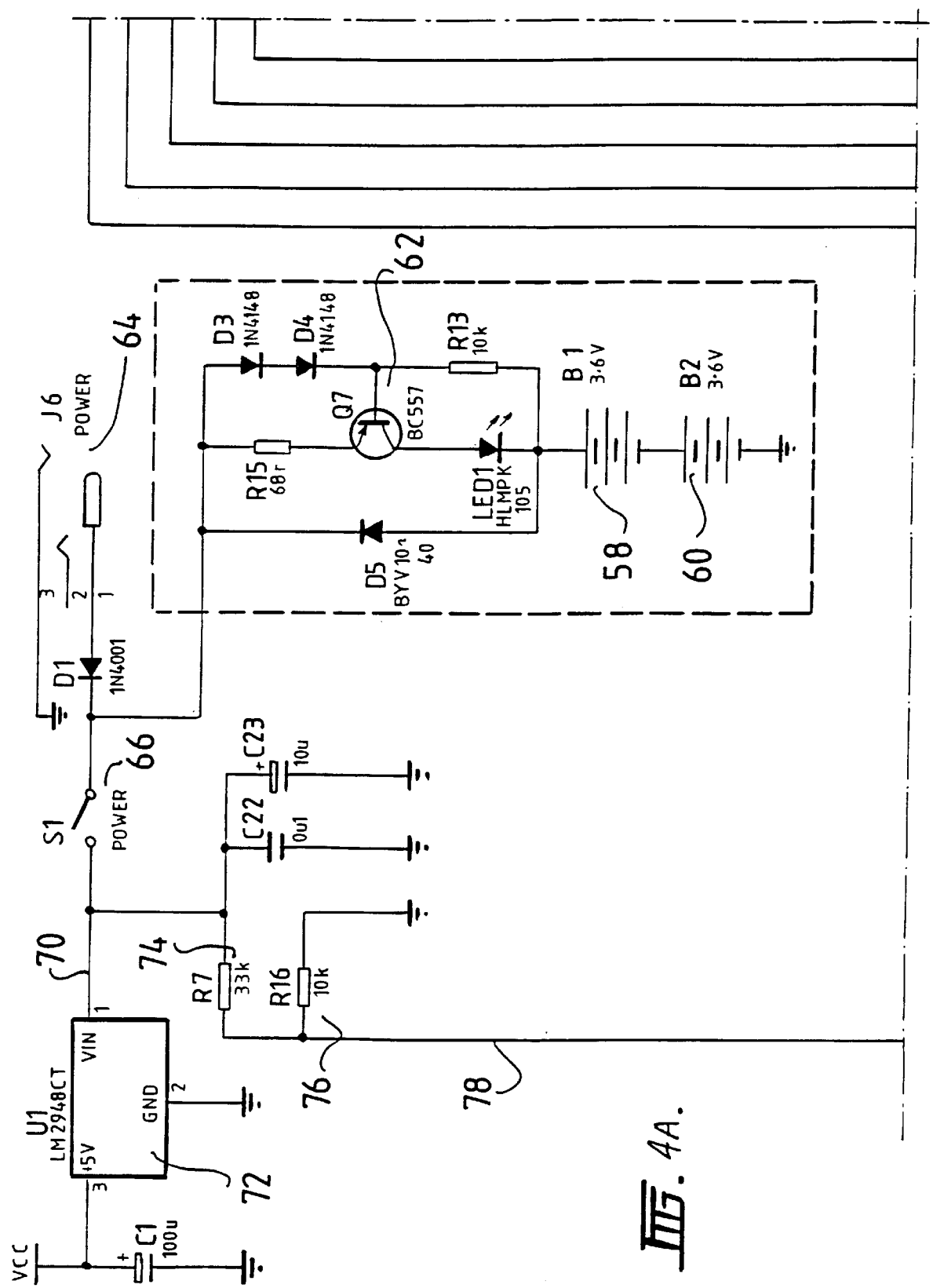
Figure 4C:
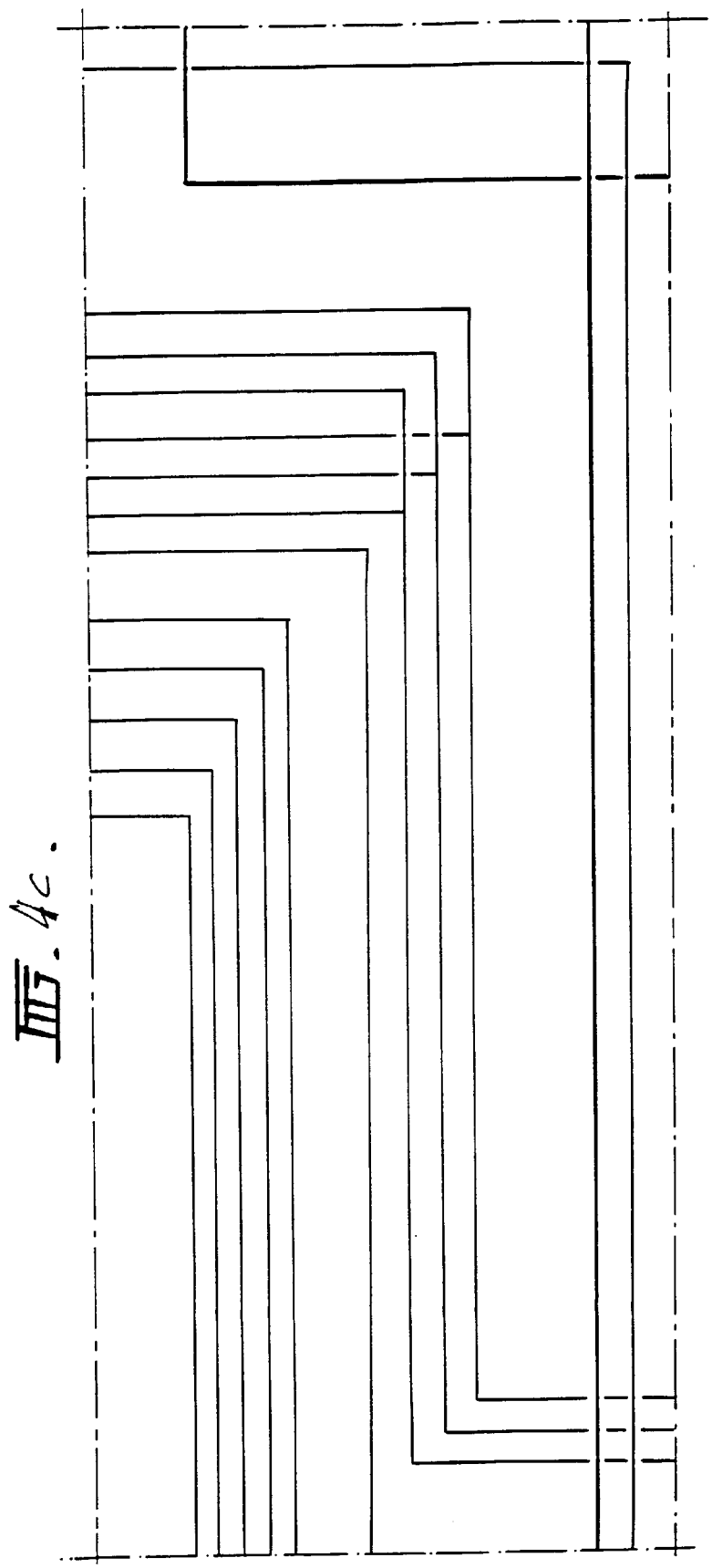
Figure 4D:
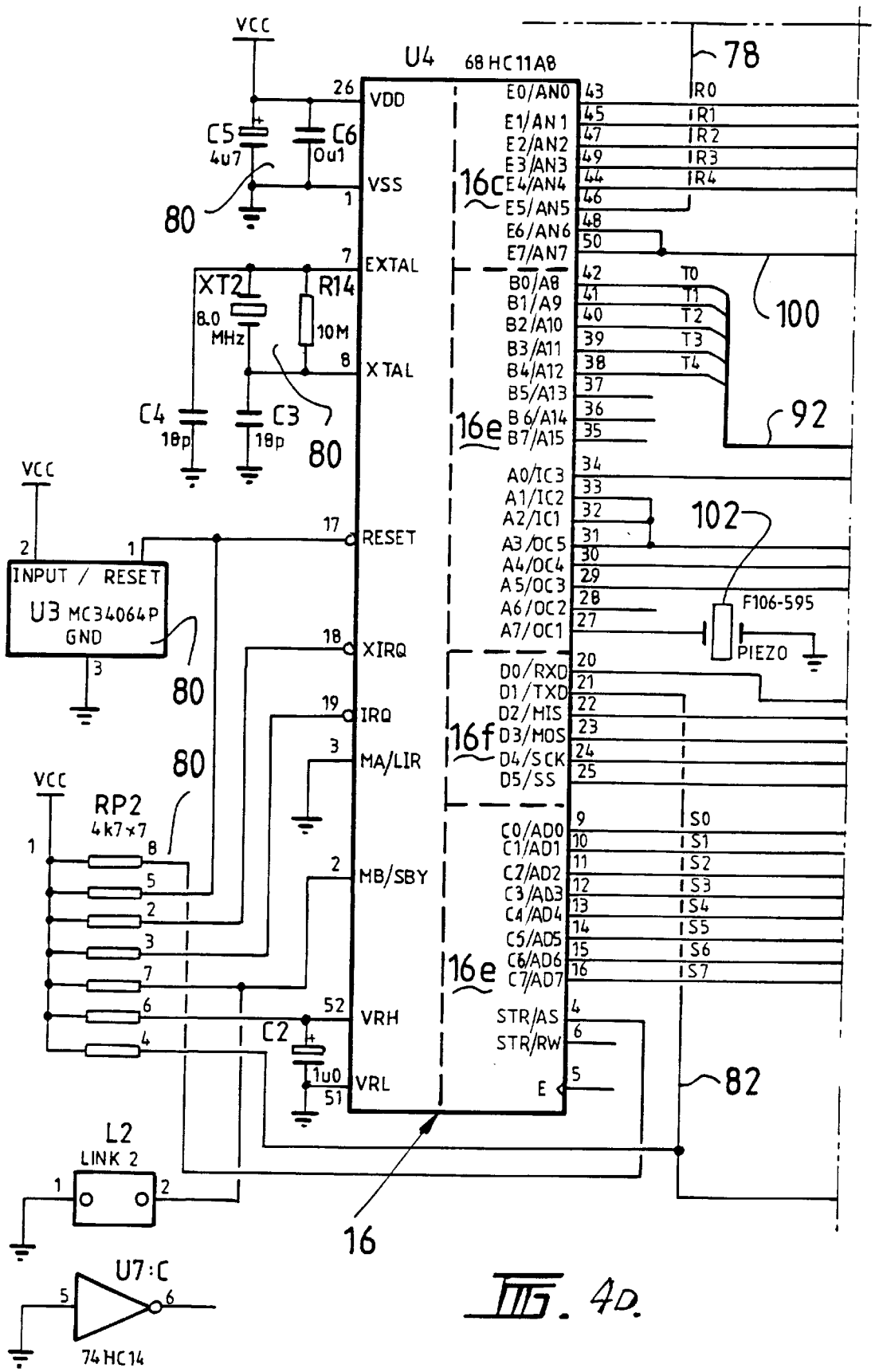
Figure 4E:
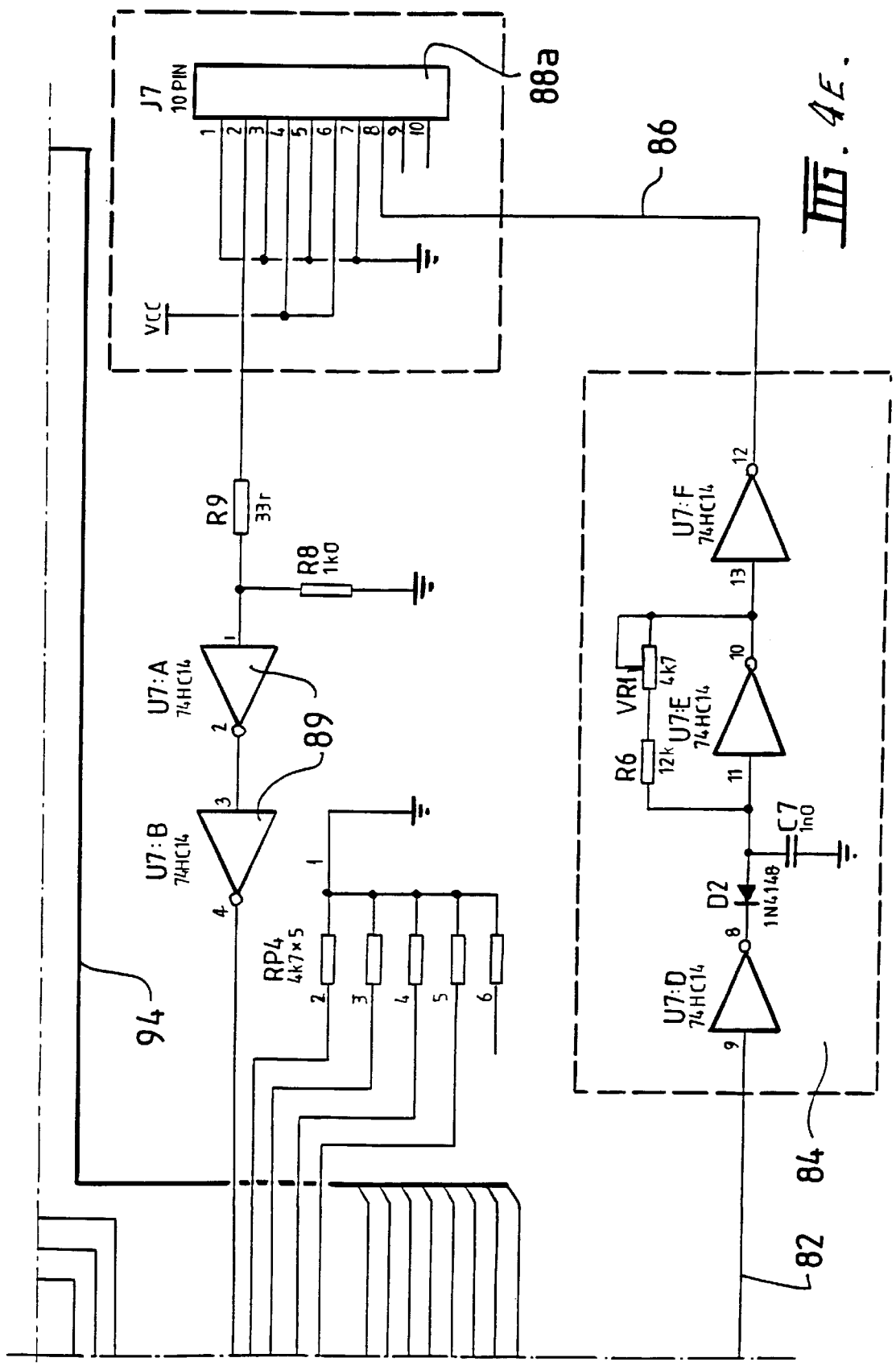
Figure 4F:
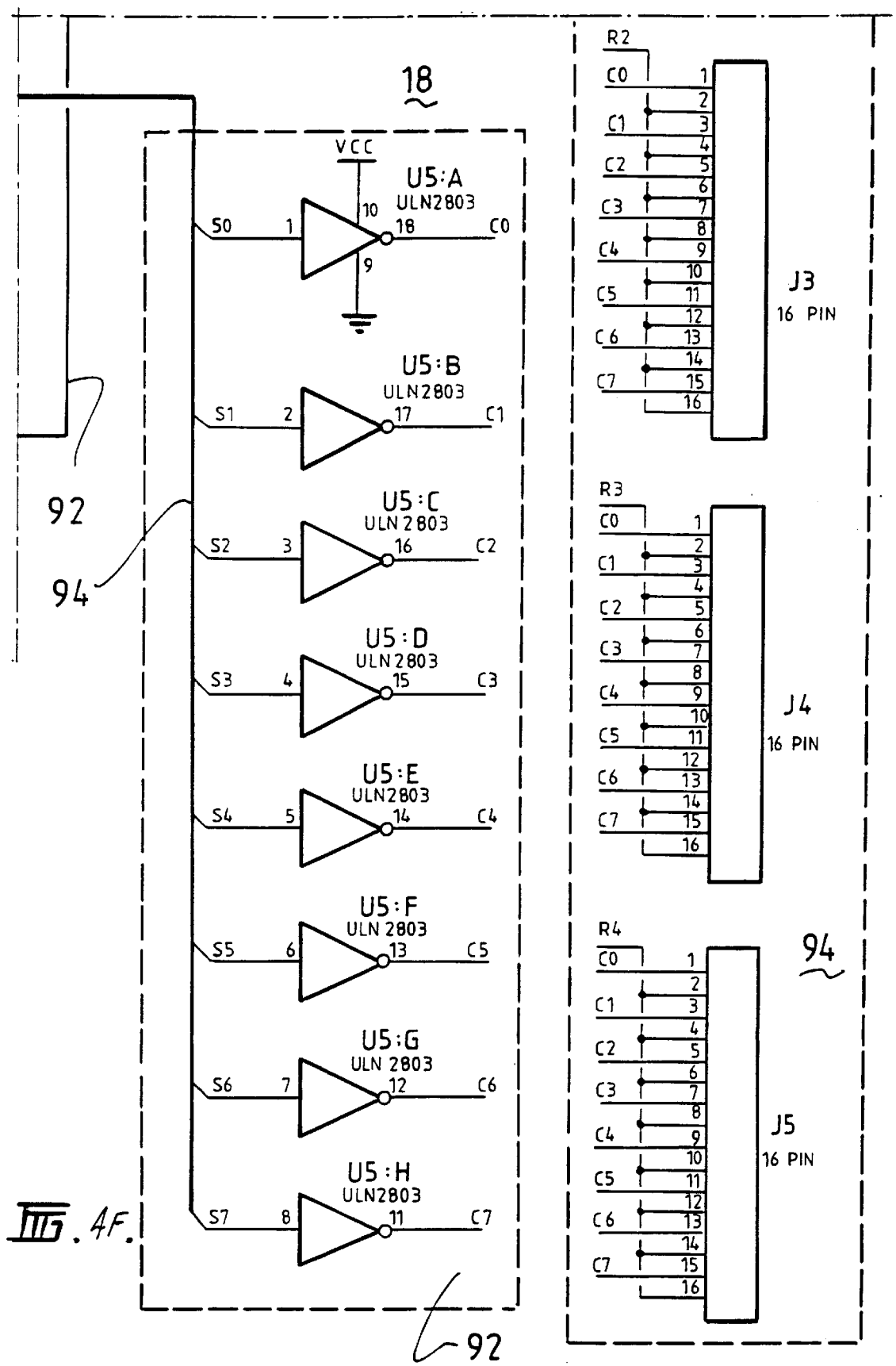

As best shown in FIG. 3, the measurement system 30 comprises a host computer 32 which is coupled to one or more cameras 34 which are intended to view an object in order to receive information relating to the object so that the shape or other geometric properties of the object can be determined.

Before measurements can be made of an object, it is necessary to calibrate the system 30 and for this purpose, the calibration frame is arranged in view of the cameras 34. The calibration frame is viewed by the cameras 34 and positional information relating to the position of targets (such as the light emitting diodes 14) is inputted into the computer 32 to enable calibration of the system in a manner known per se. After calibration the system 30 can then view an object and in a manner also known per se information relating to the shape or geometrical properties of the object can be determined by the host computer 32.

According to the preferred embodiment of this invention, the conventional measurement system 30 is modified by the inclusion of an infrared transmitter receiver 36 which is coupled to the host computer 32 for receiving and transmitting information to the infrared communications link 24 associated with the calibration frame 10.

The microprocessor controller 16 includes a microprocessor section 16a having a random access memory and read only memory 16b and 16c. A digital output 16d is provided for providing the information to LED driver circuit 18 for causing that circuit to switch on particular ones of the light emitting diodes 14. An analog to digital converter 16g is provided for receiving information from the LED driver circuit 18 and also from the temperature probe 22 and converting that information into a digital signal. The memory 20 is also connected to a digital input/output 16e for transmission and receipt of information from the memory 20. A transmitter 16f is provided for transmitting and receiving information from the infrared transceiver 24.

As previously described, the calibration frame 10 is placed in the field of view of the measurement system 30 and the host computer 32 issues command data packets via the infrared link 36-24 to the calibration frame 10. The host computer 32 requests that a particular LED 14 specified by an ordinal number, be activated. This command is carried out by the microprocessor controller 16. The measurement system 30 then senses the position of the light emitting diode in the image plane of the cameras 34 which can be displayed on a video display unit of the host computer 32 providing an X, Y coordinate in the camera-reference coordinate system. This coordinate is then stored in a memory in the host computer 32. The host computer 32 then requests that the light emitting diode be switched off and this instruction is carried out by the microprocessor controller 16. The host computer 32 then requests the microprocessor controller to send the world coordinate X, Y, Z location of the light emitting diode in question and this information is received over the infrared-link 24-36 and is stored with the image coordinate data for that light emitting diode. This process is then repeated for all other light emitting diodes on the calibration frame 10. When this is complete, the host computer system has all the information required to perform the required calibration of the measurement system 30 so that measurements can be made.

In the preferred embodiment of the invention, data transactions between the host computer 32 and the calibration frame 10 and which occur over the infrared-link 24-36, operate to a defined protocol specified as follows:
1 Packet definitions
1.1 Terminology
NOTE: all numbers within packets are in hexadecimal and are represented by numbers and upper case letters, as in 01 F2 AB etc.
LED: Light emitting diode. There are two types on the frame. The first type is used for illuminating calibration target points. The second type is used for showing the position of the spine of the calibration frame. In the preferred embodiment there are at most 38 of the type 1 LEDs and there are 2 of the type 2 LEDs. The type 1 LEDs are numbered 0 to 37 (decimal). The type 2 LEDs are numbered 38 and 39 (decimal).
Packet: An assembly of binary data for serial communications comprising a start byte (1 byte), byte count (1 byte), packet type (1 byte), data segment (0 to 254 bytes) and checksum (2 bytes).
Frame: Calibration frame
Number of points: Number of calibration points on the frame.
Scaling factor: Overall multiplier applied to all LED coordinates.
1.2 Packets sent from frame to host There are 4 kinds of packet that may be sent by the frame to the host. They are:
1. Acknowledge packet
2. Negative acknowledge packet
3. Status packet
4. Data packet.
1.2.1 Acknowledge packet 01 02 06 as tt 00 07 where:
ss=00: status ok
ss=01: battery low
tt=temperature of frame. Temperature in degrees Celsius=tt* 1.95.
The smallest temperature increment is 1.95 degrees.
1.2.2 Negative acknowledge packet 01 01 15 00 16
1.2.3 Status packet 01 02 02 ss yy zz where:
ss=0: status ok
ss=2: led open circuit
ss=4: led short circuit
1.2.4 Data packet There are three kinds of data packet that can be sent from the frame to the host. They are:
1. LED coordinate data packet
2. Serial number packet
3. Configuration packet.
All data packets from the frame to the host have the following format.

01 0D 01 ab cd ef gh ij kl mn op qr at uv wx yy zz

01=packet start
0D=number of bytes of data to follow NOT including the 2 bytes of packet checksum at the very end.
01=packet type=>This is a data packet
ab..wx are data organised as follows. Each of the letters a..x represents a decimal number, 0 to 9. Thus there are 2 decimal digits encoded in each byte so each digit occupies 1 nybble. In this case, for each pair of letters, the first is stored in the high nybble and the second in the low nybble.
1. For LED coordinate data: led x coordinate=a*100.0+b*10.0+c+d/10.0+e/100.0+f/1000.0 led y coordinate=g*100.0+h*10.0+i+j/10.0+k/100.0+l/1000.0 led z coordinate=m*100.0+n*10.0+o+p/10.0+q/100.0+r/1000.0 led group number=s+10+t
2. For Serial Number: number=abcdefghijklmnopqrst (A very long serial number)
3. For Configuration Packet: scaling factor=a*100.0+b*10.0+c+d/10.0+e/100.0+f/1000.0 number of points on frame=g*10+h number of groups of points=i*10+j remainder of digits kl..wx=00 uv=memory checksum LSBYTE wx=memory checksum MSBYTE Memory checksum is stored with the data in EEPROM and is used to check the integrity of the data. If for some reason the EEPROM data were to be corrupted, this checksum could be used to detect this. memory checksum=ab+cd+ef+gh+ij+kl+mn+op+qr+st
yy=packet checksum LSBYTE
zz=packet checksum MSBYTE
Packet checksum is calculated as the sum of all of the bytes in the packet except the packet start byte(01). In this case:
packet checksum=0x0D+01+ab+cd+ef+gh+ij+kl+mn+op+qr+st+uv+wx
Note that the Memory checksum is used to check that the EEPROM data has not been corrupted.
The packet checksum is used to check that the communications link is working properly.
1.3 Packets sent from host to frame NOTE: yy zz are packet checksums
1.3.1 Request serial number: 01 01 01 00 02
1.3.2 Request led on 01 02 02 dd yy zz where dd=LED number(0..39(dec))
1.3.3 Request led off 01 01 03 00 04
1.3.4 Request led coordinates 01 02 04 dd yy zz where dd=LED number (0..39(dec))
1.3.5 Request frame configuration 01 01 10 00 11
1.3.6 Set led coordinates This is a command to store the coordinates of a LED in EEPROM.

01 0E 05 dd ab cd ef gh ij kl n op qr at uv wx yy zz where dd=LED number (0..39(dec)) ab..wx are as defined in Section 1. Note that the data for this packet is user supplied, including a valid memory checksum (uv wx).

Note: If dd=40(dec) then the data are interpreted by the frame as a command to set a new serial number. If dd=41 (dec) then the data are interpreted by the frame as a command to set a new frame configuration.

2 Packet transactions The protocol is defined by the following interactions between the host and the frame. Note that the host is the master and all transactions are initiated by the host. The following are sample transactions. Data from the host to the frame are shown in bold face. Data from the frame to the host are in normal typeface. Checksums are in italics.

1. Request serial number (serial number= 12345678900011220000000000)

```
01 01 01 00 02
01 02 06 00 00 08
01 0D 01 12 34 56 78 90 00 11 22 00 00 00 00 00 00 01 D8
```

2. Request LED coordinate for LED number 5. Reply from frame is for coordinates x=23.540, Y=0.0, Z=15.850 with LED group number=2.

```
01 02 04 05 00 0B
01 02 06 00 00 08
01 0D 02 35 40 00 00 00 01 58 50 02 01 2F
```

3. Request LED ON for LED number 5, successful operation. 01 02 02 05 00 09 01 02 06 00 00 08
Transaction if LED open circuit. 01 02 02 05 00 09 01 02 06 02 00 0A
Transaction if LED short circuit. 01 02 02 05 00 09 01 02 06 04 00 0C
4. Request LEDs OFF. Turn off LEDs 01 01 03 00 04 01 02 06 00 08
5. Request frame configuration. For this transaction, number of groups=3. Coordinate scale factor=001.000 and UNITS indicator=1 for millimeters. 01 01 10 00 11 01 0D 03 00 10 00 01 00 00 00 00 00 00 00 00 21
6. Set LED coordinates for LED number 5.X=23.540, Y=0.0, Z=15.850 with LED group number=2. 01 0E 05 02 35 40 00 00 00 01 58 50 02 01 22 01 58 01 02 06 00 08

Figure 4:
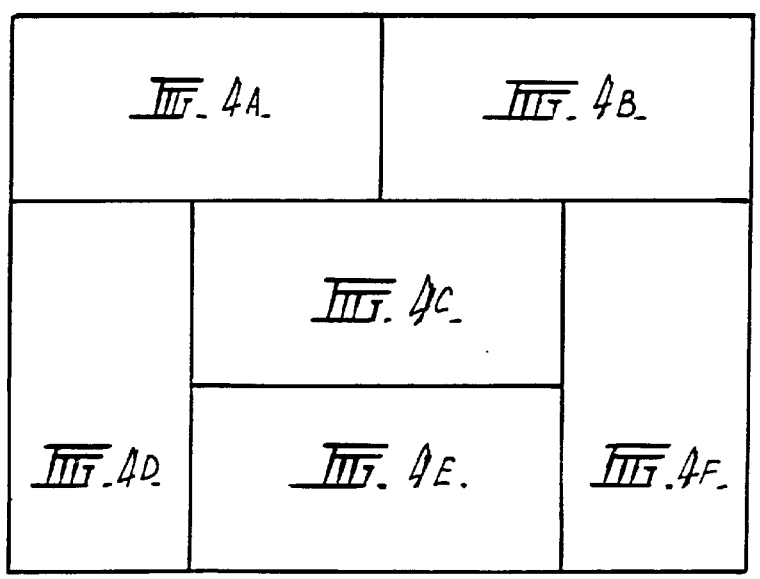

FIGS. 4 and 5 show a detailed circuit diagram of the system described with reference to FIG. 2. With reference to FIGS. 4 and 5, microprocessor controller 16 is preferably a single chip device containing a universal asynchronous receiver transmitter (UART) 16*f*, analog input 16*c* and digital input and output ports 16*e*. Rechargeable batteries 58 and 60 provide power to the electronic components on the calibration frame 10 via battery recharger 62 which is coupled to an input power plug 64. Thus, the batteries 58 and 60 can be recharged when the plug 64 is connected to a power source and then the frame can be easily transported and used at a remote location and powered by the rechargeable batteries 58 and 60 without the need to connect the calibration frame 10 to a separate power source. An on/off switch 66 is provided in power supply line 70 as is a voltage regulator 72. The power supply line 70 is connected to the microprocessor controller 16 via resistors 74, 76 and line 78.

Conventional clock, reset functions etc are connected to the microprocessor controller 16 and are referenced with numeral 80 in FIG. 4.

The microprocessor controller 16 executes a preprogrammed set of instructions which are stored in non-volatile memory (RAM 16*b* shown in FIG. 2) within the microprocessor controller 16. An output from transmitter section 16*f* on line 82 is used to gate an oscillator circuit 84 resulting in on-off keying modulation at the oscillator output 86. The output 86 is connected via connector plugs 88*a* and 88*b* to the transmitter section 106 of the transceiver 24, described in more detail hereinafter. The receiver section 108 of the transceiver 24 connects to the receiver section of the UART 16*f* via connectors 88*b* and 88*a* and buffers 89. EEPROM 20 is coupled to microprocessor 16 for storing the coordinates of the light emitting diodes on the calibration frame 10. A column driver section 90 is coupled to output section 16*e* by line 92 and a row driver section 93 is coupled to digital input output 16*e* by line 94. The driver sections 90 and 92 are connected to connectors 95 which in turn connect to the light emitting diodes on the frame 10. The column and row drivers 90 and 92 and connectors 95 basically form the LED driver circuitry 18 shown in FIG. 2. As previously described, instructions from host computer 32 are received by the microprocessor controller 16 to cause an output from the microprocessor controller 16 to activate the column and row drivers 90 and 92 and via the connectors 95 to switch on a particular one of the light emitting diodes on the frame 10.

When a light emitting diode is on, the current through the relevant column driver 90 is measured on lines 96 and applied to analog input 16*c*. If the measured current is outside the specific parameters, an error is reported to the host computer 32. A further analog input in the section 16*c* is used to measure the output of a temperature probe (not shown) which is connected to a connector 98 which in turn is connected to the section 16*c* by a line 100. The temperature probe can be of conventional structure and therefore details need not be described. Information from the temperature probe can be used by the host computer 32 to compensate for expansion and contraction in the calibration frame and to determine when the temperature of the frame has stabilised. The microprocessor controller 16 also has an audible warning system 102 which can provide an audible warning in the event of faulty operation or in the event of low battery condition of the batteries 58, 60.

The infrared-transceiver 24 comprises a transmitter section 106 which is connected to connector 88*b* and a transmitter section 108 which is also connected to the connector 88*b*. The transmitter and receiver sections 106, 108 are of conventional design and therefore full details need not be described. However, in the transmitter section 106 two infrared light emitting diodes 110 are switched by digital signals from the microprocessor controller 16 causing infrared energy to be radiated. The receiver section 108 detects infrared energy radiated from the host computer 32 and comprises an infrared remote control receiver 112 and a filter section 114 for removing short transient disturbances. The resulting signal is fed to the transmitter section 16*f* of the microprocessor controller 16 via the connectors 88a and 88b. The digital data from the host computer 32 is decoded into characters in the section 16f. The infrared-transceiver is duplicated in the host computer 32 as previously described and as shown by reference 36 to enable communication between the calibration frame 10 and the host computer 32.

In the preferred embodiment of the invention the targets are light emitting diodes. However, other switchable targets such as electrophoretic, liquid crystal or electro-mechanical displays are applicable. Although in the preferred embodiment the communication link is an infrared communication link, radio or direct wire connections are also applicable and could be used in the invention.

Since modifications within the spirit and scope of the invention may readily be effected by persons skilled within the art, it is to be understood that this invention is not limited to the particular embodiment described by way of example hereinabove.

We claim:

1. A calibration frame for a non-contact measurement system, including:

a frame structure;

a plurality of targets supported by the frame structure for viewing by the measurement system;

control means for activating each of the targets for allowing the targets to be identified by the measurement system;

memory means for storing data relating to the position of each target; and a communication link for transferring data from the calibration frame to the measurement system which relates to the position of that target.

2. A calibration frame as claimed in claim 1, wherein the targets comprise light sources.

3. A calibration frame as claimed in claim 1 or 2, further including a rechargeable battery supply for powering the calibration frame to thereby enable the calibration frame to be easily transported and used.

4. A calibration frame as claimed in claims 1 or 2, further including temperature sensing means for sensing the temperature of the environment in which the frame structure is located and for providing temperature information to thereby provide an indication of any possible expansion or contraction of the frame structure which would alter the position of the targets with respect to one another.

5. A calibration frame as claimed in claims 1 or 2, wherein the frame structure includes two adjacent sides arranged at an angle with respect to one another.

6. A calibration frame as claimed in claim 5, wherein the sides are formed from aluminium.

7. A calibration frame as claimed in claim 2, wherein the light sources comprise light emitting diodes.

8. A calibration frame as claimed in claims 1 or 2 wherein the targets are formed using an electrophoretic, liquid crystal or electromechanical display.

9. A calibration frame as claimed in claims 1 or 2 wherein the communications link is a bidirectional infrared data link.

10. A calibration frame as claimed in claims 1 or 2 wherein the communications link is a radio link or a direct wire link.

11. A calibration frame as claimed in claims 1 or 2 wherein the control system is a microprocessor controller.

12. A calibration frame as claimed in claims 1 or 2, wherein the memory means is an electrically erasable programmable read only memory.

* * * * *